(12) United States Patent
Chen et al.

(10) Patent No.: US 11,971,824 B2
(45) Date of Patent: Apr. 30, 2024

(54) ENHANCING MEMORY UTILIZATION AND THROUGHPUT IN EXECUTING A COMPUTATIONAL GRAPH

(71) Applicant: AETHERAI IP HOLDING LLC, Frisco, TX (US)

(72) Inventors: Chi-Chung Chen, Taipei (TW); Wei-Hsiang Yu, Taipei (TW); Chao-Yuan Yeh, Taipei (TW)

(73) Assignee: AETHERAI IP HOLDING LLC, Frisco, TX (US)

( * ) Notice: Subject to any disclaimer, the term of this patent is extended or adjusted under 35 U.S.C. 154(b) by 0 days.

(21) Appl. No.: 17/767,926

(22) PCT Filed: Sep. 9, 2020

(86) PCT No.: PCT/US2020/049790
§ 371 (c)(1),
(2) Date: Apr. 11, 2022

(87) PCT Pub. No.: WO2021/086498
PCT Pub. Date: May 6, 2021

(65) Prior Publication Data
US 2024/0104019 A1 Mar. 28, 2024

Related U.S. Application Data

(60) Provisional application No. 62/927,044, filed on Oct. 28, 2019.

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
CPC ...... G06F 3/061; G06F 3/0611; G06F 3/0613; G06F 12/0862; G06F 2212/1016;
(Continued)

(56) References Cited

U.S. PATENT DOCUMENTS 9,619,150 B2 * 4/2017 Kobashi ................. G06F 3/064
9,646,005 B2 5/2017 Raichelgauz et al.
(Continued)

OTHER PUBLICATIONS

Peled et al. "A Neural Network Memory Prefetcher using Sematic Locality." arXiv: 1804.00478v2 [cs.DC] Jul. 26, 2018 [retrieved on Nov. 10, 2020]. Retrieved from the Internet: <URL: https//arxiv.org/pdf/1804.00478.pdf> pp. 1-13.
(Continued)

*Primary Examiner* — Ilwoo Park
(74) *Attorney, Agent, or Firm* — Huan-Yi Lin

(57) ABSTRACT

Disclosed is a method for enhancing memory utilization and throughput of a computing platform in training a deep neural network (DNN). The critical features of the method includes: calculating a memory size for every operation in a computational graph, storing the operations in the computational graph in multiple groups with the operations in each group being executable in parallel and a total memory size less than a memory threshold of a computational device, sequentially selecting a group and updating a prefetched group buffer, and simultaneously executing the group and prefetching data for a group in the prefetched group buffer to the corresponding computational device when the prefetched group buffer is update. Because of group execution and data prefetch, the memory utilization is optimized and the throughput is significantly increased to eliminate issues of out-of-memory and thrashing.

30 Claims, 12 Drawing Sheets

(58) Field of Classification Search
CPC ....... G06F 2212/1024; G06F 2212/454; G06F 2212/602; G06N 3/02; G06N 3/045; G06N 3/0464
USPC .......................... 345/531, 536; 711/118, 137
See application file for complete search history.

(56) References Cited

U.S. PATENT DOCUMENTS

| | | |
|---|---|---|
| 9,665,288 B1 | 5/2017 | Aharoni et al. |
| 2010/0058346 A1* | 3/2010 | Narang ................. G06F 9/5066 718/102 |
| 2015/0242532 A1* | 8/2015 | Davies .................... G06F 16/00 707/798 |
| 2016/0351195 A1 | 12/2016 | Falik et al. |
| 2018/0165204 A1* | 6/2018 | Venkatesh ............. G06F 12/084 |
| 2019/0317901 A1 | 10/2019 | Kachare et al. |

OTHER PUBLICATIONS

Li et al. "A Novel Memory-Scheduling Strategy for Lagre Convolutional Neural Network on Memory-Limited Devices," Hindawi Computational Intelligence and Neuroscience vol. 2019, Article ID 4328653, pages [retrieved on Nov. 10, 2020]. Retrieved from the Internet: <URL: https://www.hindawi.com/journals/cin/2019/4328653> pp. 1-12.

International Search Report and Written Opinion dated Nov. 24, 2020 in International Patent Application No. PCT/US2020/049790, filed on Sep. 9, 2020.

\* cited by examiner

ENHANCING MEMORY UTILIZATION AND THROUGHPUT IN EXECUTING A COMPUTATIONAL GRAPH

BACKGROUND OF THE INVENTION

1. Field of the Invention

The present invention relates to methods, computer storage media and systems for enhancing memory utilization and throughput, and more particularly for enhancing memory utilization and throughput in executing a computational graph by virtue of group execution and data prefetch.

2. Description of the Related Art

The advancements in computer vision with deep learning has been constructed and perfected with time, primarily over one particular algorithm, an artificial neural network (ANN). When having more than one hidden layer, such ANN is called DNN (Deep Neural Network). Being one type of DNN, CNN (Convolutional Neural Network) appears to be a typical neural network model extracting image features from input images with significant number of pixels passed therein. However, when it comes to high-resolution image with enormous number of pixels, such as CT (Computed Tomography), WSI (Whole Slide Image) in digital pathology, and satellite imagery, it is challenging to DNN because of the out-of-memory (OOM) issue. Among some approaches tackling the OOM issue, one alternative called patch-based method delivers an inefficient pre-processing procedure that crops a high-resolution image into tens of thousands of small patches (normally 256×256) and annotates them for the image beforehand. Despite some successful results, the patch-based method demands that all ground truths on each image patch need to be given by free-hand contouring them, which ends up to be highly labor-taking. Secondly, borders between different classes, such as two types of tissue and terrains, may be hard to be distinguished and it possibly leads to inconsistent annotation from specialists who annotate them. Lastly, in the event of high object variability in terms of morphology, it is difficult to cover all possible examples during annotation and to sample representative patches during training.

To cope with the foregoing drawbacks of the patch-based method, CUDA (Compute Unified Device Architecture) Unified Memory (UM) was brought in to virtually extend the memory capacity by swapping data of GPU to system memory when GPU is out of memory while giving the leeway not to alter the typical training procedure. However, as a result of low access rate of system memory as well as serial operation for data transfer and computing, the goal of UM is not fulfilled and the overall performance in training a DNN using UM is not satisfactory.

SUMMARY OF THE INVENTION

An objective of the present invention is to provide a method, a computer storage medium, and a computing platform for enhancing memory utilization and throughput in executing a computational graph, which optimizes the memory utilization and throughput by grouping operations in the computational graph for serial execution of groups and parallel execution of the operations in each group under the premise of causing no OOM and reducing the chance of thrashing and simultaneously executing groups and prefetching data for groups to be executed.

To achieve the foregoing objective, the method for enhancing memory utilization and throughput in executing a computational graph is performed by at least one central processing unit (CPU) of a computing platform and comprises:

(a) calculating a working set size of every operation in a computational graph;

(b) categorizing the operations of the computational graph into multiple groups with at least one operation contained in each group and a total of the working set sizes the at least one operation in the group less than a memory threshold of at least one computational device of the computing platform connected to and coordinated by the at least one CPU;

(c) prefetching data associated with one selected from multiple examples of a dataset for executing a prefetch number of the groups N ahead of all others in the multiple groups to a corresponding GPU, wherein N is an integer greater than zero;

(d) sequentially selecting one of the multiple groups as a current group;

(e) simultaneously executing the at least one operation in the current group in the corresponding GPU and prefetching data associated with the example for executing a next group not yet prefetched to the corresponding computational device until both group execution and data prefetch are completed for the current group;

(f) iterating the foregoing step (d) until the multiple groups are executed.

To achieve the foregoing objective, a computer storage medium having computer-executable instructions thereupon that, when executed by at least one central processing unit (CPU) of a computing platform, cause the computing platform to similarly perform the steps (a)-(f) of the foregoing method, and a computing platform comprising at least one CPU, at least one computational device, and a computer-readable medium storing instructions that, when executed by the at least one CPU, cause the at least one CPU and the at least one computational device to similarly perform the steps (a)-(f) of the foregoing method.

According to the foregoing description of the method, the working set sizes for each operation in the computational graph of a DNN is calculated first; multiple groups are created in a sequential manner with each group having at least one operation and the total working set size less than and near to the GPU memory threshold; the data associated with a new example in the dataset for at least one starting group identical to the prefetch depth in number is prefetched; a current group is sequentially selected for execution; execution of the current group and prefetching data associated with the example for executing the group that is behind the current group by the prefetch depth in group are simultaneously performed; the foregoing processes are iterated until the multiple groups for the new example are executed and all the examples of the dataset for training the DNN are selected in an epoch. By virtue of serial group execution and data prefetched for groups to be executed, the goal of circumventing the OOM issue in GPU and lowering the chance of thrashing between CPU and GPU can be achieved.

Other objectives, advantages and novel features of the invention will become more apparent from the following detailed description when taken in conjunction with the accompanying drawings.

DETAILED DESCRIPTION OF THE INVENTION

Figure 1:
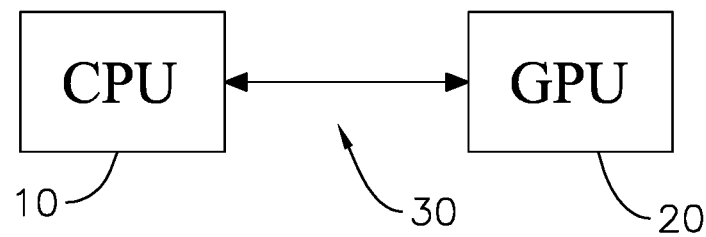
FIG. 1 is a functional block diagram of a first embodiment of a computing platform in training the DNN in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), central processing units (CPUs), graphics processing units (GPUs), tensor processing units (TPUs), vision processor units (VPUs), dataflow processing units (DPUs), intelligent processing units (IPUs), etc.

The described embodiments concern one or more methods, systems, apparatuses, and computer readable mediums storing processor-executable process steps for enhancing memory utilization and throughput of a computing platform in executing a computational graph by virtue of an approach called group execution and data prefetch. Such computational graph may be generated by a deep neural network (DNN) or an image processing application but not limited thereto. In the case of a deep neural network, the computational graph is generated when a DNN model is chosen and takes a form of a tree with operations located on the tree to be executed in a sequence defined by the topology of the tree. In the case of an image processing application, filters based on Local Laplacian algorithm in the computation graph can be referred to as operations that transform an image-like data into another image-like data, just like what layers do in DNN and the intermediate data in image processing is also similar to feature maps in DNN. In the subsequent description, DNN is chosen as the example to elaborate all details about the present invention. The goal of group execution and data prefetch is to (1) reduce the total amount of data transfer between GPU and CPU, (2) increase the bandwidth between main memory of CPU and GPU, and (3) hide the latency of swapping. Group execution tackles (1) and Group prefetch sorts out (2) and (3). With endeavor in group execution and group prefetch, memory utilization of GPUs can be more optimized relative to conventional technique, such as UM, and the issue of out-of-memory (OOM) of GPU during execution can be also mitigated. In the embodiments, the computing platform includes at least one CPU (Central Processing Unit) and at least one GPU (Graphics Processing Unit), and the at least one CPU calculates a working set size of every operation of the DNN, stores the operations in separate groups to ensure that each group won't cause thrashing because of its size, makes initial data prefetch, select a current group at a time, simultaneously executes the current group in a corresponding GPU and prefetches data required for executing at least one group to the corresponding GPU until the multiple groups are serially and completely executed.

With reference to FIG. 1, a first embodiment of the computing platform in training the DNN in accordance with the present invention includes a CPU 10 and a GPU 20 connected to the CPU 10, which is a simplest topology of the computing platform required to train the DNN. In one embodiment, the link between the CPU 10 and the GPU 20 is a PCIe (Peripheral Component Interconnect express) link.

Figure 2:
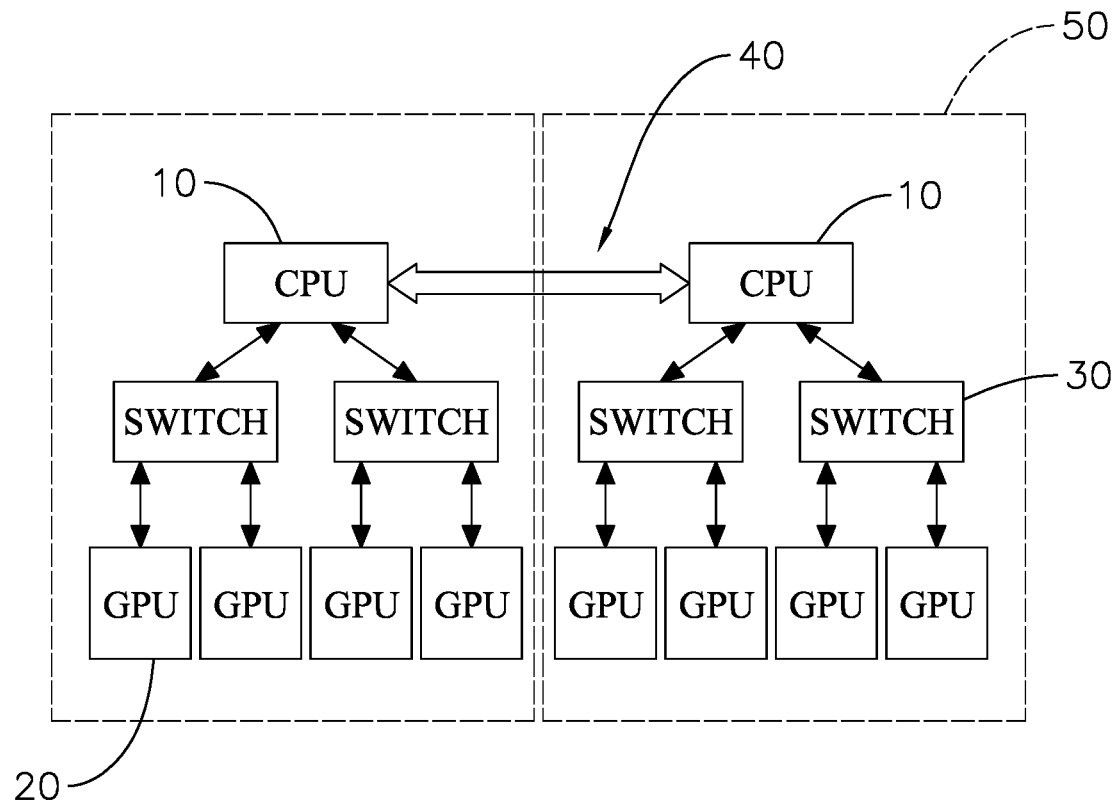
FIG. 2 is a functional block diagram of a second embodiment of a computing platform in training the DNN in accordance with the present invention.

With reference to FIG. 2, a second embodiment of the computing platform in training the DNN in accordance with the present invention includes two CPUs 10 and eight GPUs 20. The two CPUs 10 are connected by a point-to-point processor interconnect 40, a UPI (Ultra Path Interconnect) in one embodiment. Each CPU 10 is connected to four GPUs 20 through two switches 30. The eight GPUs 20 are usually of a same memory size. Specifically, two of the four GPUs are connected to the CPU 10 via one of the two switches 30, which establishes point-to-point connectivity between the CPU 10 and the switch 30 to ensure that the two GPUs 20 perform serial communication with the CPU 10. In one embodiment, the switch 30 is a PCIe switch. To allow each CPU 10 to access its local memory faster than non-local memory or memory local to the other processor or memory shared between the two CPUs 10, each CPU 10 and the two switches 30 and the four GPUs 20 connected to the CPU 10 constitute a non-uniform memory access (NUMA) node 50 (enclosed by dash line) in favor of intra-communication within the NUMA node 50 while curbing inter-communication between the NUMA nodes 50. Under the circumstance that the DNN is a CNN model and the model is trained on images with higher resolution, the size of model parameters remains static when almost everything, e.g. feature maps and computation time, scales with the resolution. This in turn makes the inter-communication cost among NUMA nodes 50, depending on the size of the model parameters, relatively small. Despite the use of the GPU in the embodiments of FIGS. 1 and 2, a computational device may be a generic name intended as for the term GPU here and the computational device may be one of GPU, TPU, VPU, IPU and the like. The generic name 'computational device' can be interchanged with any of GPU, TPU, VPU, IPU and the like throughout the entire disclosure.

The DNNs trained in the present invention can indicate any type of artificial neural network (ANN) as long as the ANN can be expressed as a computational graph. In that scenario, the DNNs may include but are not limited to convolution neural network (CNN), recurrent neural network, autoencoder, and the like.

Figure 3:
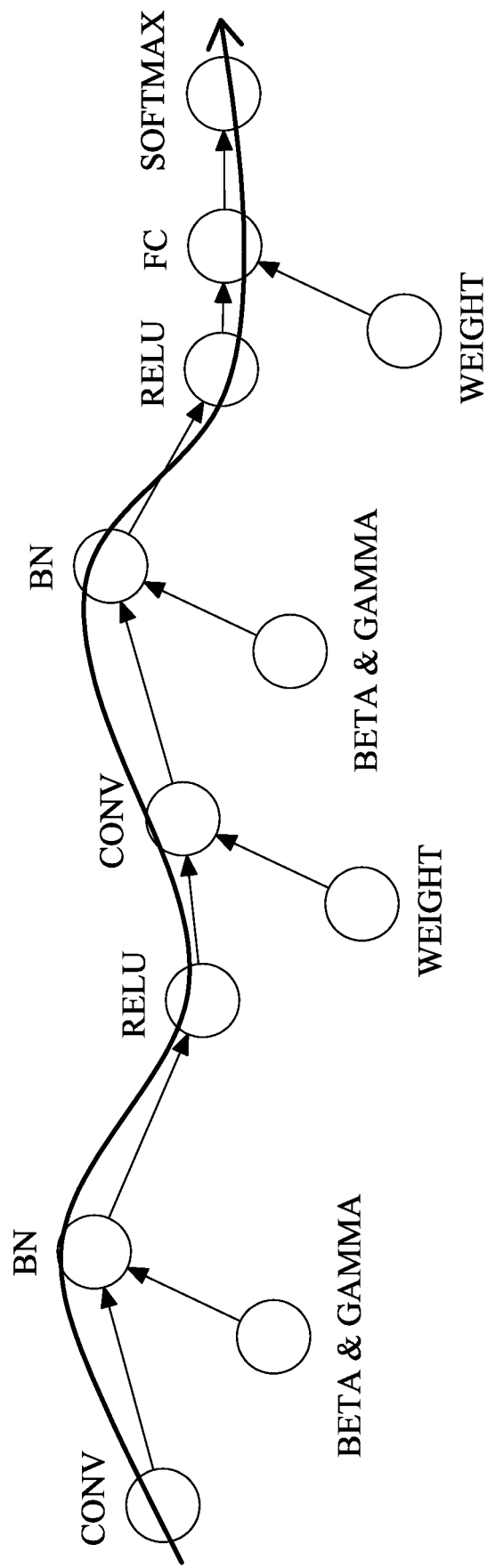
FIG. 3 is a schematic diagram showing a computational graph of a DNN in accordance with the present invention.

With reference to FIG. 3, a computational graph taken as a non-limiting example indicative of operations involved in a CNN is shown. The operations associated with the nodes in the computational graph are represented by circles and are cony, bn, beta & gamma, relu, weight, fc, and softmax, which represent convolution operation, batch normalization, loading of mean and standard deviation, activation for convolution results, loading of weights, operation for fully-connected layer, and activation for classification respectively. The nodes are interconnected by edges, which are those arrowed lines in FIG. 3 and each shows dependency between connected nodes. Each edge connected between two operations with the operation pointed to by an arrowhead of the edge defined to have dependency with the other operation. Such dependency indicates an order of execution that the two operations associated with the dependency are executed serially and the operation pointed to by the arrowhead of the edge will not start execution until the operation opposite to the arrowhead finishes its execution. Sometimes, one operation may have more than one dependency associated therewith, for example, the operation bn having dependency with both the operations cony and beta & gamma. A curved arrowed line in FIG. 3 indicates a topological order, which is a longest path generated by a topological sort algorithm and extending from a starting operation to an ending operation in the computational graph. The topological order is an order of the operations serially executed by the nodes traversed along the longest path. For sake of brevity, we use operations for the remaining description while leaving node out because of our emphasis in operations more. What we like to point out here is that each operation may take place in a corresponding layer, for example, one of the input layer, multiple hidden layers, and the output layer of a DNN. However, in reality, each layer of a real DNN may have huge amount of operations executed thereon. Generally, an operation is a basic unit in a group discussed later.

Figure 4:
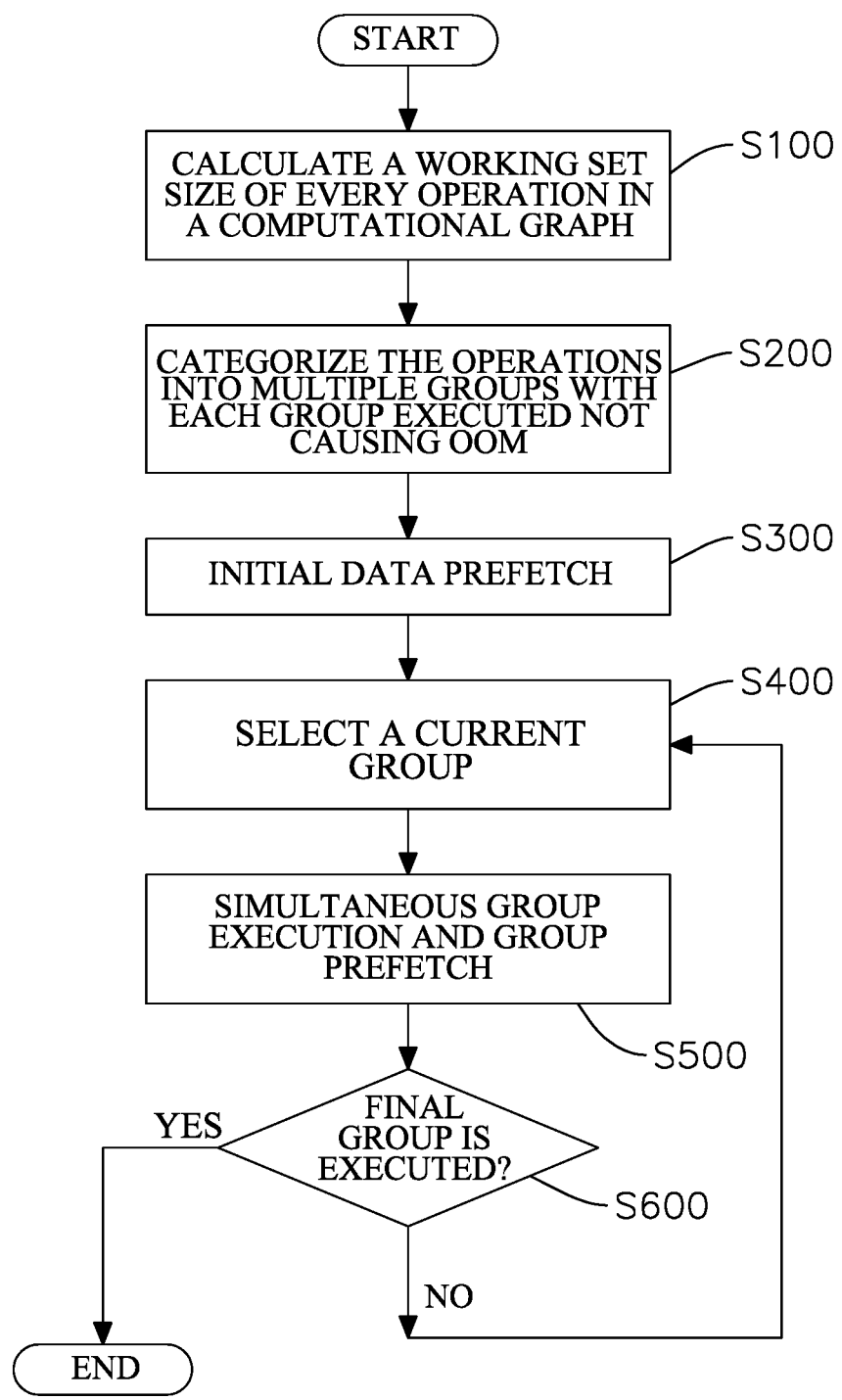
FIG. 4 is a flow diagram showing a method for enhancing memory utilization and throughput of a computing platform in training a DNN in accordance with the present invention.

With reference to FIG. 4, a method for enhancing memory utilization and throughput of a computing platform in training a deep neural network (DNN) is implemented based on the philosophy of group execution and data prefetch, is performed by the foregoing computing platform including a CPU and at least one computational device connected to and coordinated by the CPU, and includes the following steps.

Step S100: Calculate a working set size of every operation in a computational graph of the DNN. Since the DNNs all have a computational graph with multiple operations, before moving on to later steps for grouping, it is critical to know a working set size of each operation in the computational graph. Basically, the working set size of an operation can be defined as a total memory size of input data, intermediate data and output data required for execution of the operation. The working set size for each operation just requires to be calculated once for any DNN. Given the operation cony in the CNN shown in FIG. 3 as an example, the input data is from either an input layer (not shown) or a feature map outputted from the operation relu, the intermediate data is intermediate calculation results of a feature map generated during execution of the operation cony, and the output data is a feature map outputted from the operation cony.

Step S200: Separately store the operations traversed through the computational graph in multiple groups. What the current step intends to do is to create multiple groups on condition that at least one operation is contained in each group and a total of the working set sizes of the at least one operation is less than a memory threshold of the at least one GPU. The GPU memory threshold is a maximum memory size for execution of at least one operation of each group in a GPU without causing OOM and thrashing. The demand for the total of the working set sizes of the operations in each group to be less than the GPU memory threshold of any GPU is a GPU memory constraint that circumvents the issue of OOM and the chance of thrashing when the group is executed in a GPU. The so-called thrashing is a phenomenon that when a GPU realizes that OOM is likely to happen upon execution of a group, the GPU allocates some of its data that are recently least used to a CPU connected to the GPU, and when the cause of OOM disappears, the CPU then swaps the data back to the GPU. Although the thrashing issue can be alleviated by data swapping, system performance in terms of training time suffers from such swapping because swapping data back and forth between CPU and GPU involves slow processes.

Step S300: Prefetch data associated with one selected from multiple examples of a dataset with multiple examples for executing a prefetch number of the groups N ahead of all others in the multiple groups to a corresponding GPU, in which N is an integer greater than zero. The prefetch number of the groups can be defined as a prefetch depth indicative of a total number of the groups maintained in the corresponding GPU at all times. Specifically, the at least one of the groups associated with the prefetch depth are sequentially selected and data for executing the at least one of the groups in the corresponding GPU needs to be prefetched to the corresponding GPU before the execution starts. The current step is performed once for each example as it serves as a preliminary data prefetch prior to the execution of any of the groups. The preliminary data prefetch may differ from a runtime data prefetch, which will be introduced in a later step S500, in the count of groups associated with the data being prefetched. Upon the preliminary data prefetch, the count of groups associated with the data being prefetched is the prefetch depth regardless of whether the prefetch depth is greater than one or not. In contrast, the count of groups associated with the data being prefetched for the runtime data prefetch is always one, which aims at overwriting data for the already executed group with data for a new group to be executed, to keep the count of groups associated with the data being prefetched in the corresponding GPU always the same as the prefetch depth on a runtime basis. Thus, when the prefetch depth is more than one, the preliminary data prefetch and the runtime data prefetch differs from each other in the count of groups associated with the data being prefetched. The choice of the prefetch depth depends on a situation whether the memory size of the GPU is affordable to runtime data required for a current group under execution and in some cases previously prefetched data pending for a turn of its execution without causing OOM and thrashing. Given an example of the prefetch depth being 1, except data for executing the first group (group 1) prefetched for the preliminary data prefetch, data for executing one group (group N+1, N>=1) next to the current group (group N) sequentially selected from the multiple groups is prefetched for the runtime data prefetch in exchange of data already used by an executed group till the last group (group M) is selected. After execution, the data associated with the executed group in a GPU for execution of a group having dependency with the executed group will be protected against being overwritten until the execution of the group is done while all other data associated with the executed group in the GPU are free to be overwritten. The prefetch depth can be combined with the GPU memory threshold as two useful parameters jointly configured to suit for different trainings for avoidance of OOM and thrashing. The transfer rate provided by UM for on-demand access to access data in the memory of CPU from a GPU is 3.6 GB/s. When the group prefetch is implemented by Prefetch API by making calls to CUDA (Compute United Device Architecture) runtime library, the transfer rate is 10.3 GB/s, which is more efficient than that of UM. Besides, the on-demand access performs data transfer and computing serially, while both operations through prefetch API can be processed in parallel. Experiments show that group prefetch reduces the on-demand access count from 21942 per batch to 2048 per batch (90.5% fewer), thus making group prefetch in the present invention an effective approach to out the drawbacks of UM.

Step S400: Sequentially select one of the multiple groups as a current group. The current step does nothing but sequential selection of one of the multiple groups as a current group for execution, which can be taken as a reference (group N) from which a next group (group N+prefetch depth) associated with prefetched data is supposed to be selected after a number of groups, in which the number here is the prefetch depth.

Step S500: Simultaneously execute the at least one operation in the current group in the corresponding GPU and prefetch data associated with the example for executing a next group not yet prefetched to a corresponding GPU until both group execution and data prefetch are completed for the current group. It should be stressed that both the group execution and data prefetching are parallelly processed in a GPU until both tasks are done. Basically, the prefetched data for executing a group is the input data for executing all the operations in the group. The data prefetch what we encounter in the current step is the runtime data prefetch. The concept of such runtime data prefetch is to prefetch the input data for executing a group trailing the current group by the number of groups to a GPU before execution of the group and upon execution of the current group. As stated in the previous step S400, the trailing number is the prefetch depth and there is only one group prefetched at one time during the runtime data prefetch. In the event that the prefetch depth is equal to one, the current group is executed in a GPU while data for one group successive to the current group is prefetched to the GPU in parallel to the execution of the current group. In the event that the prefetch depth is more than one, for example 2, the current group is executed in a GPU while data for the group trailing the current group by two groups is prefetched to the GPU in parallel to the execution of the current group. Group execution and data prefetching in each GPU performed in an overlapping manner can increase the degree of process parallelism and hide latency, which is the idle time for awaiting data supposed to be ready for execution but not in the GPU, and is thus beneficial to shortening the time required for training. Besides the scheme of group execution and group prefetch, a mixed precision approach adopting the half-precision floating-point format, which occupies 16 bits in memory and requires half amount of memory space, and the full-precision floating-point format to store prefetched data and executing the multiple groups in the corresponding GPU mostly through the half-precision floating-point format can increase the throughput without affecting the convergence.

Step S600: Determine if the multiple groups are completely executed. When the determination result is negative, perform step S400. Otherwise, terminate the method. As S100 to S600 are the steps for executing one example, with an epoch for a dataset having multiple examples and a batch size being one, for example, operations in the computational graphs are repeatedly executed associated with each example in the dataset until no more example is available. When the at least one computational device includes one computational device, the multiple groups associated with each example of the dataset are executed in series in the computational device in the step S500. When the at least one computational device includes multiple computational devices, the multiple groups associated with each example of the dataset are executed in series in a corresponding computational device and all the groups associated with the multiple examples of the dataset are executed in parallel in the respective computational devices in the step S500.

As far as the group execution topology of operations is concerned, a grouping approach taking traversal sequence of operations, dependency of operation, parallelism of operations in a group, and the GPU memory constraint into account is addressed to fulfill the grouping of operations. In one embodiment, the sequences what the traversal of the operations follows are (1) the operations in the topological order having no dependency, (2) the operations which have no dependency and are aligned in multiple branch paths branching from the operations not selected in the topological order, (3) the operations having dependency with other selected operations in the branch paths branching from the operations not selected in the topological order, and (4) the operations not selected in the topological order. Each of the foregoing traversal sequences (1), (2), (3) and (4) may need to go through all the operations in the computational graph once, if necessary. After one group is created, the traversal of operations is resumed from an operation next to an ending operation of the group in the computational graph. The parallelism of operations in a group can be attained by having at least one operation in the group executed in parallel.

The scenario behind the grouping approach is to first traverse all the operations having no dependency in the computational graph, store as many the traversed operations having no dependency as possible in each of at least one group until a grouping memory condition is met, then traverse all operations having dependency in the computational graph, and store as many the traversed operations having dependency with previous operations already stored in the at least one group ever created as possible in at least another one group until the grouping memory condition is met. The grouping memory condition specifies that a total working set size of any group ever created reaches the GPU memory threshold of the GPU. The total working set size is a total memory size of a group required for execution of at least one operation in the group. A new group needs to be created to store any operation when the operation having no dependency or having dependency fails to be stored in a current group because the grouping memory condition is met. The operations having no dependency or having dependency are stored in at least one group executed serially while at least one operation in each group is executed in parallel.

The grouping approach provides a grouping sequence that stores the operations having no dependency in groups with higher priority for execution and then the operations having dependency with other operations already stored in the previously created groups in other groups with less priority for execution. Please be noted that each group is created on condition that all operation(s) therein are executed in parallel and the total working set size of the operation(s) is less than the GPU memory threshold.

Figure 5:
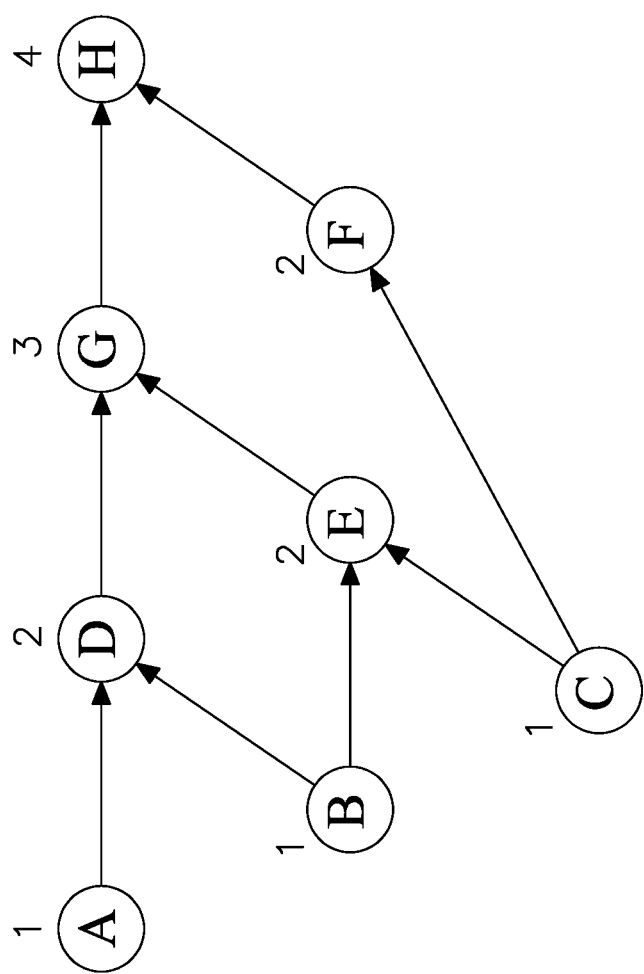
FIG. 5 a schematic diagram showing traversal sequences of operations in a computational graph for a first embodiment of a grouping approach in accordance with the present invention.
Figure 6:
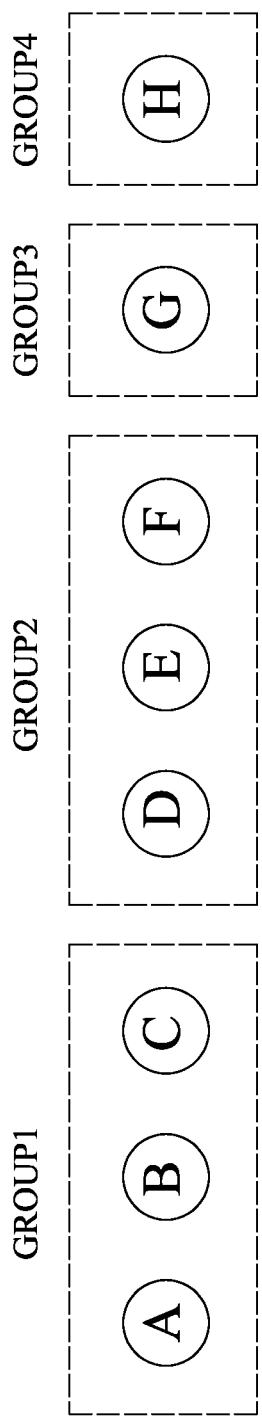
FIG. 6 is a schematic diagram showing groups created with the operations traversed in FIG. 5.

With reference to FIGS. 5 and 6, an example illustrated to depict the grouping approach emphasizing operation parallelism includes a computational graph that contains the operations indicated by A to H and the traversal sequences marked by the numbers 1 to 4 and a group that contains four groups 1-4. The traversal sequences 1 to 4 here are assigned to exemplify the foregoing traversal sequences for the grouping approach. It is assumed that the operations A, D, G and H are located in the topological order, and each group in FIG. 6 has its total working set size less than the GPU memory threshold or it is used to store the remaining operation(s) having no dependency or having dependency. The operations A, B, C having no dependency that are traversed in a traversal sequence marked by the number 1 are stored in the GROUP 1. The operations D, E, F having dependency with the operations A, B, C in the GROUP 1 and traversed in a traversal sequence marked by the number 2 are stored the GROUP 2. The operation G having dependency with the operations D, E in the group 2 and traversed in a traversal sequence marked by the number 3 is stored in the GROUP 3. The operation H having dependency with the operations F, G in the GROUP 2, 3 respectively and traversed in a traversal sequence marked by the number 4 is stored in the GROUP 4.

Figure 7:
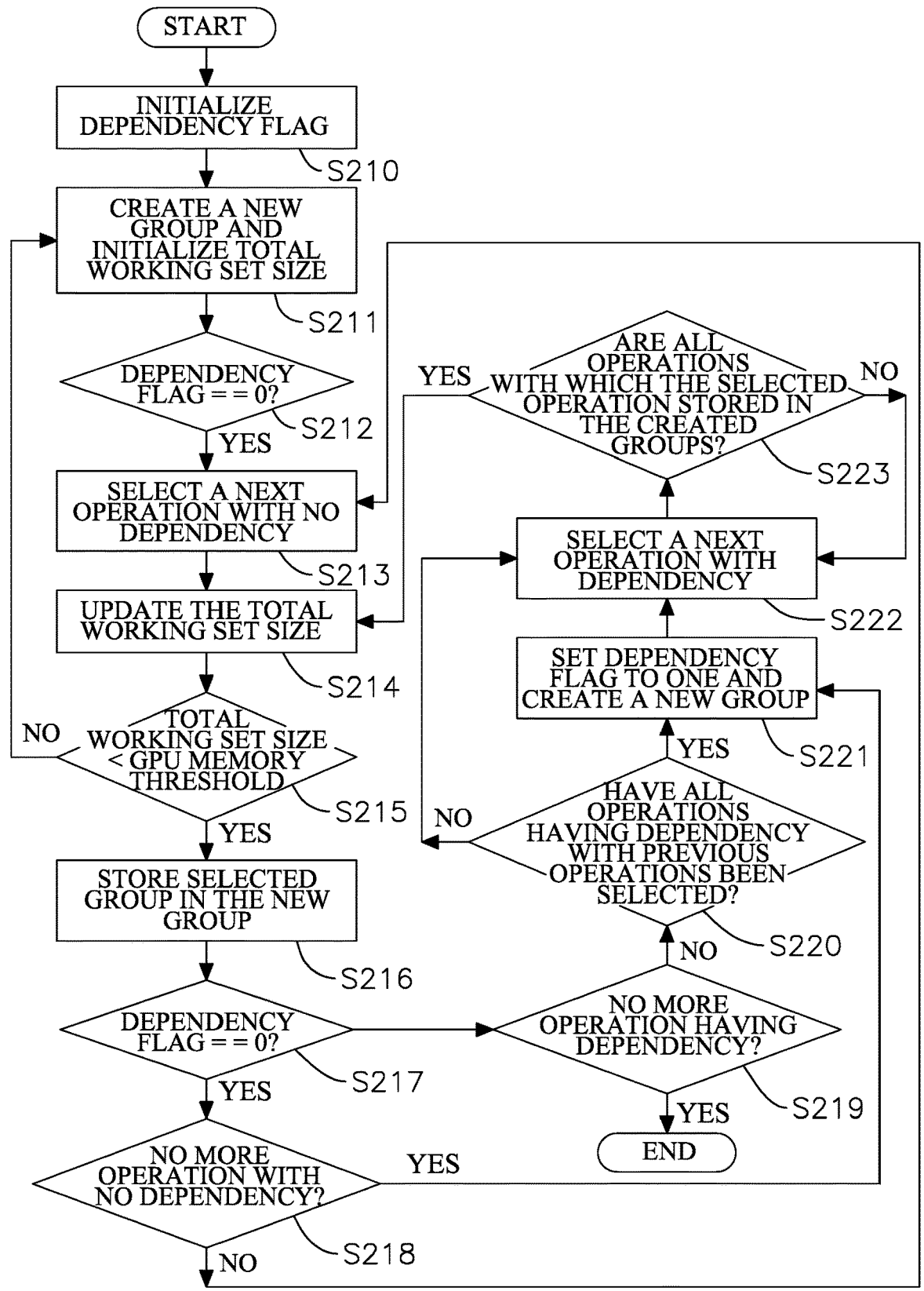
FIG. 7 is a flow diagram showing the first embodiment of the grouping approach in accordance with the present invention.

With reference to FIG. 7, a first embodiment of the grouping approach includes the following steps.

Step S210: Initialize a dependency flag to zero. The dependency flag serves to differentiate the steps for traversing operations in the computational graph having no dependency with any other operation from those having dependency with other operations in the computational graph. When the dependency flag is set to be zero, it indicates that the steps for traversing operations in the computational graph having no dependency with any other operation prevail. When the dependency flag is set to be one, it indicates that the steps for traversing operations in the computational graph having dependency with any other operation prevail.

Step S211: Create a new group and initialize a total working set size of the new group to zero. In view of a plenty of operations of a DNN, multiple groups are necessary to be created for storage of the operations and intended group execution. Each group here is defined for storage of at least one operation capable of executed in parallel while all the groups are executed serially. The total working set size is a sum of the working set sizes of all the operations stored in a created group and is required for execution of the operations of the group in a GPU without causing OOM and thrashing.

Step S212: Determine if the dependency flag is zero. When the determination result is positive, perform step S213. Otherwise, perform step S221. The current step intends to separate the following steps for grouping operations with no dependency and for grouping operations with dependency.

Step S213: Select a next one of the multiple operations in a computational graph having no dependency with any other operation in the computational graph by traversing through the computational graph according to a traversal sequence. What the current step concerns is to identify all the operations having no dependency with any other operation in the computational graph by traversing through the computational graph in a sequence following the foregoing traversal sequence (1).

Step S214: Update the total working set size by adding the working set size of the selected operation thereto for the new group. The total working set size is equal to a total of the working set sizes of all the operations in the new group, which are executed in parallel.

Step S215: Determine if the total working set size is less than a GPU memory threshold. When the determination result is positive, perform step S216. Otherwise, perform step S211.

Step S216: Store the selected operation in the new group. Please refer to GROUP 1 in FIG. 6. Each new group may have at least one operation stored therein, which can be executed in parallel.

Step S217: Determine if the dependency flag is zero. When the determination result is positive, perform step S218. Otherwise, perform step S219.

Step S218: Determine if there is no operation having no dependency with any other operation in the computational graph for selection. When the determination result is positive, perform step S221. Otherwise, resume step S213. The current step intends to verify whether entire operations having no dependency with any other operation in the computational graph have been selected.

Step S219: Determine if there is no operation having dependency with any other operation in the computational graph for selection. When the determination result is positive, terminate the process. Otherwise, perform step S220. The current step intends to verify whether entire operations having dependency with corresponding operations in the computational graph have been selected.

Step S220: Determine if every operation having dependency with any previous operation in the groups already created has been selected. When the determination result is positive, perform step S221. Otherwise, perform Step S222. The current step intends to verify whether all the operations having dependency with previous operations in the groups already created have been selected.

Step S221: Set the dependency flag to one, create a new group, and initialize the total working set size of the new group to zero. The current step is intended for creation and initialization of a new group that stores some other operations not yet selected in the computational graph but having dependency with previous operations in the groups already created. The dependency flag is set to one for grouping the operations having dependency with other operations.

Step S222: Select a next one of the multiple operations in the computational graph having dependency with any other operation in the computational graph by traversing through the computational graph according to at least one traversal sequence. There are times when multiple operations having dependency are aligned in one or more than one traversal sequences with a fraction of the multiple operations in each traversal sequence. One operation having dependency with at least one previous operation already stored in the groups already created can be sequentially selected at a time from the fraction of the multiple operations in each traversal sequence till all the operations in the multiple traversal sequences having dependency with previous operations in the groups already created are completely selected. The traversal sequences here correspond to the traversal sequences 2, 3 and 4 for the grouping approach and are the traversal sequences illustrated by the example in FIG. 5 and marked by the numbers 2, 3, and 4. In an example as shown in FIG. 5, the operation marked by D is selected one if the previous operation A, B, which are the operation with no dependency with any other operation and are already stored in the created group by steps S213-S216.

Step S223: Determine if every operation with which the selected operation has dependency is stored in the groups already created. When the determination result is positive, perform step S214. Otherwise, perform step S222. Given the same example in FIG. 5, supposing that the operation D, E or F is selected, the current step check if the operation(s) A and D, B and C or C with which the selected operation D, E or F has dependency and which are/is already stored in a created group.

The embodiment of the grouping approach addressed by FIGS. 5 to 7 intends to maximize parallelism of operation execution in a group. Its concept targets at grouping as many operations capable of being executed in parallel as possible. Nevertheless, some of the operations in a group may not be the operations to be executed immediately and such grouping approach may thus leave prefetched data for operations not immediately executed in a GPU for long enough, not only occupying the memory space of the GPU but possibly resulting in thrashing when OOM becomes likely in the GPU. Instead of putting emphasis on operation parallelism, another grouping approach that focuses on operation locality with consecutive operations in the computational graph grouped sequentially is addressed to tackle the issue caused by operation parallelism. Similarly, traversal sequence of operations, dependency of operation, and the GPU memory constraint also plays the critical roles in fulfilling the grouping approach. In one embodiment, the sequences what the traversal of the operations in the computational graph follows are (1) one trunk operation sequentially selected at a time along the topological order and having no dependency or having dependency with a previously selected trunk operation until the trunk operation has dependency with at least one branch operation in at least one branch path branching from the trunk operation, (2) one branch operation selected at a time in each of the at least one branch path toward a most recently-selected trunk operation and having no dependency or having dependency with at least one other previously-selected branch operation, and (3) the most recently-selected trunk operation having dependency with a previously selected trunk operation and at least one previously selected branch operation in the at least one branch path branching from the most recently-selected trunk operation, (4) the operations selected by iterating the traversals of (1)-(3) till an ending trunk operation in the topological order is selected. As operation locality is on top of the list, the above sequences of traversals select the operations in the computational graph based on their sequences of execution, which are dominated by their dependency. Speaking of the dependency, regardless of the grouping approaches in favor of operation parallelism or operation locality, one operation having dependency with at least another one operation in the computational graph should not be executed until the at least another one operation finishes its execution. The operation locality specifies that any consecutive two operations selected from the computational graph should be two operations that can be executed back-to-back.

After the sequences of traversals for operations in the computational graph are determined, the selected operation(s) is/are stored in a newly created group according to the sequences of traversals until a grouping memory condition is met. The grouping memory condition specifies that a total working set size of the selected operations in the group reaches the GPU memory threshold of the GPU. The major discrepancy between operation parallelism and operation locality resides in parallel operation execution prevailing in operation parallelism but mixed parallel and serial operation execution in operation locality. The way to distinguish whether an operation in a group is executed in series to any other operation is to apply a barrier that can be inserted before an operation to indicate that the operation must wait for its execution until all operations ahead thereof finish their execution. The barrier pertains to a software concept implemented between two adjacent groups for the two groups to perform serial execution.

Figure 8:
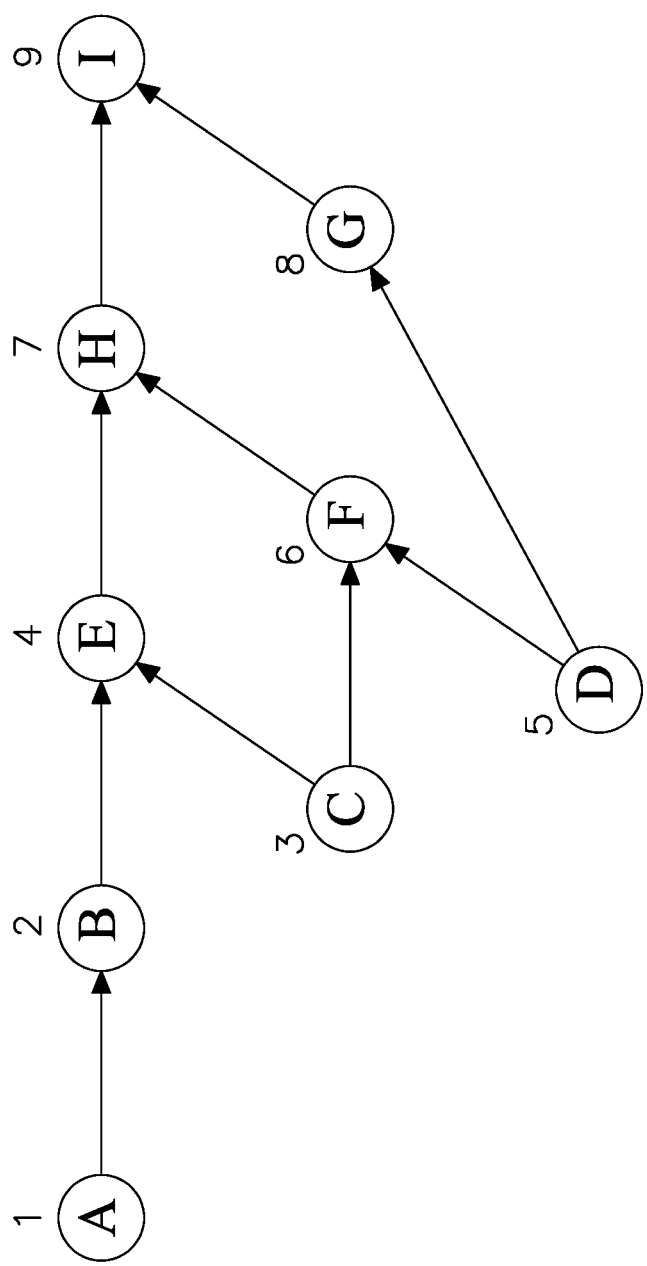
FIG. 8 a schematic diagram showing traversal sequences of operations in a computational graph for a second embodiment of a grouping approach in accordance with the present invention.
Figure 9:
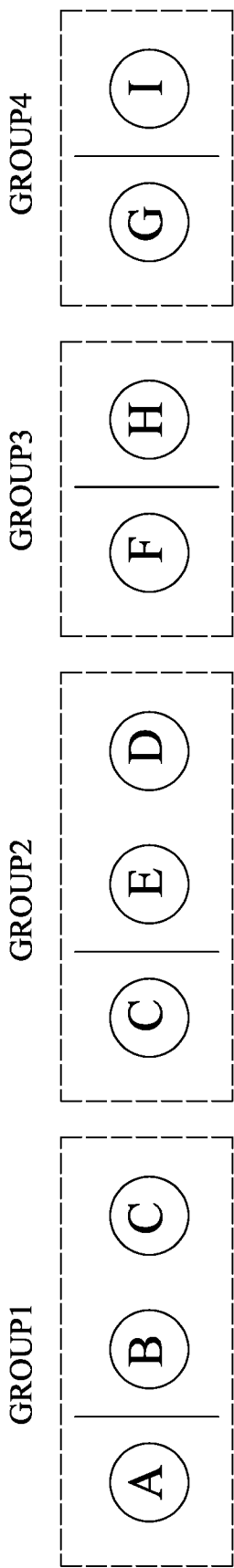
FIG. 9 is a schematic diagram showing groups created with the operations traversed in FIG. 8.

With reference to FIGS. 8 and 9, an example is illustrated to depict the grouping approach that generates the group execution topology and emphasizes in operation locality. The traversal sequences 1 to 9 here are assigned to exemplify the traversal sequences relevant to the grouping approach. The operations A, B, E, H and I are located in the longest path or the topological order. It is assumed that each group in FIG. 9 has its total working set size less than the GPU memory threshold. Based on the sequence of traversal (1), the operation A having no dependency that is selected and marked by the number 1 is stored in the group 1 and the operation B having dependency with a previously selected operation A and marked by the number 2 is stored in the group 1. Then, the operation C that is selected and marked by the number 3 according to the sequence of traversal (2) is stored in GROUP 1. The operation E that is selected and marked by the number 4 according to the sequence of traversal (3) is stored in GROUP 2. According to the sequence of traversal (4), the operation D that is selected and marked by the numbers 5 is stored in GROUP 2, the operations F and H that are selected and marked by the numbers 6 and 7 are stored in GROUP 3, and the operations G and I that are selected and marked by the numbers 8 and 9 are stored in GROUP 4. It is noted that a barrier taking the form of a straight bar is inserted between the operations A and B, indicating that the operation B has dependency with the operation A. As mentioned, all groups in the present invention are executed in series, and there is need to put any barrier between any two groups.

Figure 10:
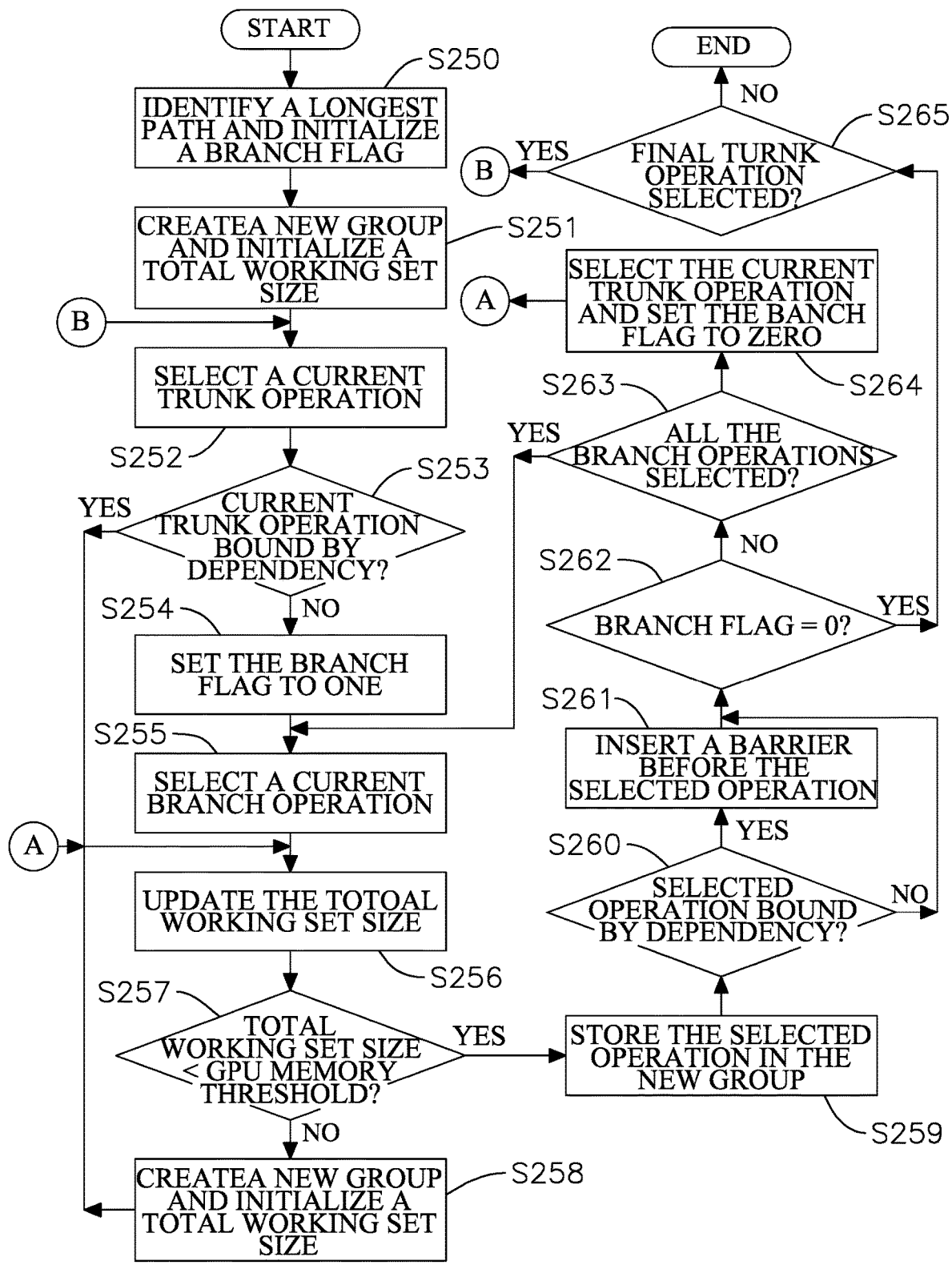
FIG. 10 is a flow diagram showing the second embodiment of the grouping approach in accordance with the present invention.

With reference to FIG. 10, a second embodiment of the grouping approach includes the following steps.

Step S250: Identify a longest path in a computational graph of a DNN with multiple trunk operations aligned therein and initialize a branch flag to zero. The longest path is also known as the topological order and may be deemed as a trunk of the computational graph. The longest path may have multiple trunk operations located thereon. With reference to FIG. 8, the path traversing through the trunk operations A, B, E, H and I is the longest path or the topological order. Besides the longest path, the computational graph may have multiple branch paths extending outwards from the trunk operations in the longest path. Each branch path may have at least one branch operation located thereon. One example of illustrating the branch path is given by the path traversing through the branch operations D and F. The sequences of traversal can follow the topological order and the branch paths to select all the operations in the computational graph.

Step S251: Create a new group and initialize a total working set size of the new group to zero. In view of a plenty of operations of a DNN, multiple groups are necessary to be created for storage of the operations and intended group execution. With reference to FIG. 9, an example of illustrating the groups created based on the operations in the computational graph in FIG. 8 is given. Each group here is defined for storage of at least one operation regardless of if the at least one operation is executed parallelly or serially or both. The total working set size is a sum of the working set sizes of all the operations stored in a created group and serves as an indicator about how much memory the operations of the group occupy in a GPU.

Step S252: Select a next one of the multiple trunk operations as a current trunk operation. The basic concept of traversal of operations is to traverse one trunk operation at a time along the topological order and then traverse through a branch path after encountering a trunk operation having dependency with one branch operation on the branch path. One trunk operation is selected at a time along the topological order in a sequential manner. In FIG. 8, the trunk operations A, B, E, H and I are sequentially selected.

Step S253: Determine if the current trunk operation has no dependency or only has dependency with a precedent trunk operation stored in the group(s) ever created. When the determination result is positive, perform the step S256. Otherwise, perform step S254. The current step intends to determine if the current trunk operation is bound by its precedent trunk operation, if any, at the moment because the current trunk operation can only start execution after the finish of execution of its precedent trunk operation or equivalently, the precedent trunk operation should appear in the group(s) ever created before the current trunk operation does. When the determination result is negative, it means that the current trunk operation has dependency with any other operation not in the topological order or in a branch path extending from the current trunk operation. In FIG. 8, the trunk operation A is an example of having no dependency, and the determination result is negative in the event that the trunk operation E is selected since it has dependency with the branch operation C.

Step S254: Set the branch flag to one. The branch flag serves to indicate where traversal of operation is. When the branch flag is zero, it means that the traversal is in the topological order. When the branch flag is nonzero, it means that the traversal is in one of the branch paths.

Step S255: Select a next one of at least one operation in at least one branch path toward the current trunk operation as a current branch operation. As one trunk operation may have at least one branch path extending outwards therefrom, the current step intends to select one branch operation at a time in one of the at least one branch path toward the current trunk operation as the current branch operation. In FIG. 8, when the current trunk operation is H, the branch operations D and F in the branch path extending from the current trunk operation H are sequentially selected.

Step S256: Update the total working set size by adding the working set size of the selected operation thereto for the new group.

Step S257: Determine if the total working set size is less than a GPU memory threshold. When the determination result is positive, perform step S259. Otherwise, perform step S258. When the total working set size exceeds the GPU memory threshold, it is time for a new group to be created and the total working set size is initialized to zero.

Step S258: Create a new group and initialize a total working set size of the new group to zero and resume step S256.

Step S259: Store the selected operation in the new group.

Step S260: Determine if all the operation(s) with which the selected operation has dependency is stored in the groups ever created. When the determination result is positive, perform step S261. Otherwise, perform step S262. The current step intends to identify the need of adding a barrier before the currently selected operation when the currently selected operation has dependency with any other operation.

Step S261: Insert a barrier between the selected operation and the operation before the selected operation. In FIG. 9, a barrier is added between the operations A and B in the GROUP 1, C and E in the GROUP 2, F and H in the GROUP 3 or G and I in the GROUP 4. As a result of no barrier between the operations B and C in the GROUP 1 and between the operations E and D, the operations B and C or E and D can be executed in parallel when the GROUP 1 or the GROUP 2 is executed. However, each of the operation B, E, H, I must wait for its execution until a corresponding one of the operations A, C, F and G finishes its execution.

Step S262: Determine if the branch flag is zero. When the determination result is positive, perform step S265. Otherwise, perform step S263.

Step S263: Determine if the at least one operation in the at least one path branching from the current trunk operation are not completely selected. When the determination result is positive, resume step S255. Otherwise, perform steps S264.

Step S264: Set the selected operation to the current trunk operation and the branch flag to zero and resume step S256. After the at least one branch operation in the at least one branch path is completely selected, the current trunk operation is a next operation to be selected. The current step intends to select the current trunk operation and return the traversal of operation back to the topological order.

Step S265: Determine if the selected operation is a final trunk operation. When the determination result is positive, resume step S252. Otherwise, exit the process.

Figure 11:
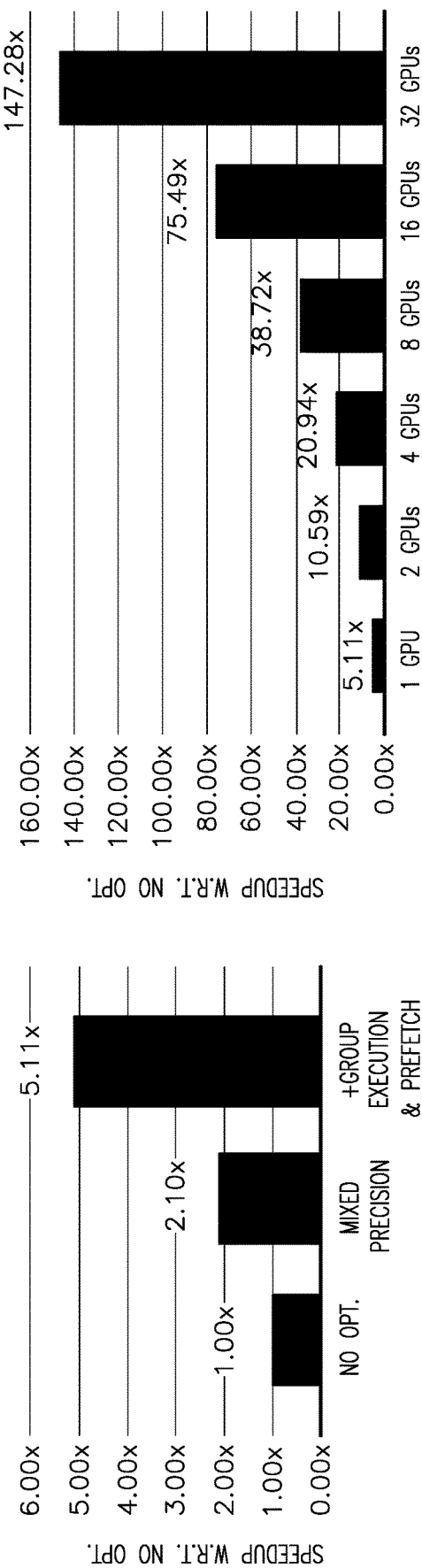
FIG. 11 includes two bar charts for benchmarking the group execution and data prefetch approach, the mixed-precision approach and the UM approach in terms of speedup performance.

As to the performance demonstrated by the group execution and group prefetch, mixed-precision approach and the UM approach, the training pipeline is deployed on a multi-GPU, multi-CPU computing platform. With reference to FIG. 11, a bar chart on the left shows that the speeds delivered by the mixed-precision approach and the group execution and group prefetch are 2.1 times and 5.11 times faster respectively than the UM approach (represented by no option). The bar chart on the right side of FIG. 11 indicates that the speedup of the group execution and group prefetch with respect to the UM approach ranges from 5.11 times to 147.28 times for the computing platform using one GPU up to 32 GPUs.

Figure 12:
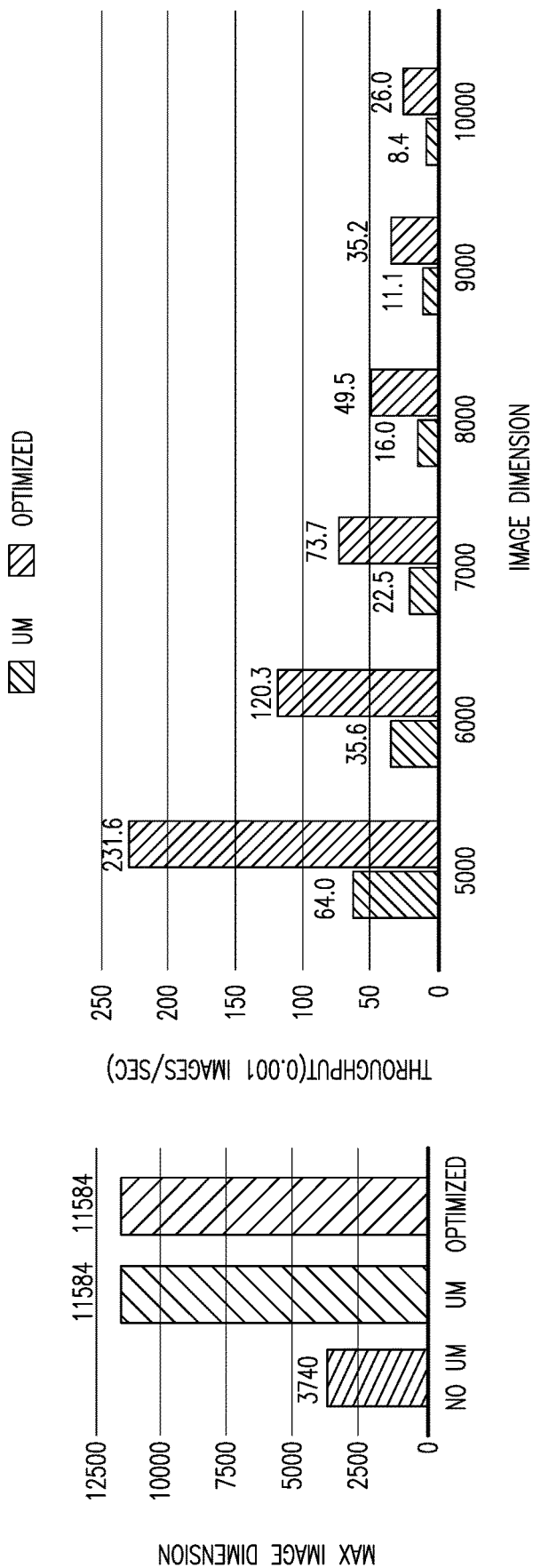
FIG. 12 includes two bar charts for benchmarking the group execution and data prefetch approach and the UM approach.

To further benchmark no UM, UM and the present invention, an experiment with an input image is conducted on a computing platform with 2 CPUs and 8 GPUs with 32 GB per GPU. With reference to FIG. 12, the benchmarking results on the left bar chart show the maximal resolution allowed for the input image, namely, 3740×3740 for no UM and 11584×11584 for UM and the present invention. As far as the image resolution is concerned, the allowable input images for both the present invention and UM are 9.6 times of that of no UM but are tied mutually. However, under the circumstance of same image resolution, the right bar chart in FIG. 12 shows the results benchmarked for the throughput of the present invention and UM, which indicate that the throughput of the present invention is over 3 times of that of UM for all the resolutions given on the chart.

Last but not least, please be noted that the computing platform in training the DNN as illustrated in FIGS. 1 and 2 is provided with computer-executable instructions thereupon, and alternatively, the computer-executable instructions, when executed, cause the computing platform to perform or the at least one CPU of the computing platform performs the steps S200 to S700 in FIG. 4 when the computer-executable instructions are executed by the at least one CPU of the computing platform.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for enhancing memory utilization and throughput of a computing platform, the method performed by the computing platform including a central processing unit (CPU) and at least one computational device connected to and coordinated by the CPU and the method comprising:
   (a) calculating a working set size of every operation in a computational graph;
   (b) categorizing the operations of the computational graph into multiple groups with at least one operation contained in each group and a total of the working set sizes of the at least one operation in the group less than a memory threshold of the at least one computational device;
   (c) prefetching data associated with one selected from multiple examples of a dataset for executing a prefetch number of the groups N ahead of all others in the multiple groups to a corresponding computational device, wherein N is an integer greater than zero; (d) sequentially selecting one of the multiple groups as a current group;
   (e) simultaneously executing the at least one operation in the current group in the corresponding computational device and prefetching data associated with the example for executing a next group not yet prefetched to the corresponding computational device until both group execution and data prefetch are completed for the current group; and
   (f) iterating the foregoing step (d) until the multiple groups are executed.

2. The method as claimed in claim 1, wherein the working set size of each operation is a total memory size of input data, intermediate data and output data required for execution of the operation.

3. The method as claimed in claim 1, wherein in the steps (c) and (e) the prefetched data are input data for executing the prefetch number of the groups and the next group not prefetched yet.

4. The method as claimed in claim 1, wherein the memory threshold and the prefetch number of the groups N are jointly configured to prevent OOM and thrashing upon execution of each group in each of the at least one computational device.

5. The method as claimed in claim 1, wherein in the step (e), when the at least one computational device includes one computational device, the multiple groups associated with each example of the dataset are executed in series in the computational device.

6. The method as claimed in claim 1, wherein in the step (e), when the at least one computational device includes multiple computational devices, the multiple groups associated with each example of the dataset are executed in series in a corresponding computational device and all the groups associated with the multiple examples of the dataset are executed in parallel in the respective computational devices.

7. The method as claimed in claim 1, wherein
a topological order is a longest path generated by a topological sort algorithm and extending from a starting operation to an ending operation in the computational graph; and
the operations of the computational graph are categorized into the multiple groups according to a sequence of (1) the operations in the topological order having no dependency, (2) the operations which have no dependency and are aligned in multiple branch paths branching from the operations not selected in the topological order, (3) the operations having dependency with other selected operations in the branch paths branching from the operations not selected in the topological order, and (4) the operations not selected in the topological order.

8. The method as claimed in claim 1, wherein
a topological order is a longest path generated by a topological sort algorithm and extending from a starting operation to an ending operation in the computational graph and a trunk operation is defined as one operation on the topological order and a branch operation is defined as one operation not on the topological order; and
the operations of the computational graph are categorized into the multiple groups according to a sequence of (1) one trunk operation sequentially selected at a time along the topological order and having no dependency or having dependency with a previously selected trunk operation until the trunk operation has dependency with at least one branch operation in at least one branch path branching from the trunk operation, (2) one branch operation selected at a time in each of the at least one branch path toward a most recently-selected trunk operation and having no dependency or having dependency with at least one other previously-selected branch operation, (3) the most recently-selected trunk operation having dependency with a previously selected trunk operation and at least one previously selected branch operation in the at least one branch path branching from the most recently-selected trunk operation, (4) the operations selected by iterating the (1) to (3) of the sequence till an ending trunk operation in the topological order is selected.

9. The method as claimed in claim 1, wherein the step (b) includes:
(b1) initializing a dependency flag to zero;
(b2) creating a new group and initializing a total working set size of the new group to zero;
(b3) determining if the dependency flag is zero;
(b4) selecting a next one of the multiple operations in a computational graph having no dependency with any other operation in the computational graph by traversing through the computational graph according to a traversal sequence when determining that the dependency flag is zero;
(b5) updating the total working set size by adding the working set size of the selected operation thereto for the new group;
(b6) determining if the total working set size is less than a memory threshold;
(b7) storing the selected operation in the new group;
(b8) determining if the dependency flag is zero;
(b9) determining if there is no operation having no dependency with any other operation in the computational graph for selection when determining that the dependency flag is zero;

(b10) determining if there is no operation having dependency with any other operation in the computational graph for selection when determining that the dependency flag is one;
(b11) determining if every operation having dependency with any previous operation in the groups already created has been selected;
(b12) setting the dependency flag to one, creating a new group, and initializing the total working set size of the new group to zero when a determination result of the step (b11) is positive;
(b13) selecting a next one of the multiple operations in the computational graph having dependency with any other operation in the computational graph by traversing through the computational graph according to at least one traversal sequence when a determination result of the step (b11) is negative;
(b14) determining if every operation with which the selected operation has dependency is stored in the groups already created; and
(b15) resuming the step (b5) when a determination result of the step (b14) is positive; otherwise, resuming the step (b13).

10. The method as claimed in claim 1, wherein the step (b) includes:
(b1') identifying a longest path in a computational graph of a DNN with multiple trunk operations aligned therein and initializing a branch flag to zero;
(b2') creating a new group and initializing a total working set size of the new group to zero;
(b3') selecting a next one of the multiple trunk operations as a current trunk operation;
(b4') determining if the current trunk operation has no dependency or only has dependency with a precedent trunk operation stored in the groups ever created and performing step (b7') when a determination result of the current step is positive and step (b5') when the determination result of the current step is negative;
(b5') setting the branch flag to one;
(b6') selecting a next one of at least one operation in at least one branch path toward the current trunk operation as a current branch operation;
(b7') updating the total working set size by adding the working set size of the selected operation thereto for the new group;
(b8') determining if the total working set size is less than a memory threshold and performing step (b10') when a determination result of the current step is positive and step (b9') when the determination result of the current step is negative;
(b9') creating a new group and initialize a total working set size of the new group to zero and resume the step (b7');
(b10') storing the selected operation in the new group;
(b11') determining if all the operations with which the selected operation has dependency is stored in the groups ever created and performing step (b12') when a determination result of the current step is positive and step (b13') when the determination result of the current step is negative;
(b12') inserting a barrier between the selected operation and the operation before the selected operation;
(b13') determining if the branch flag is zero and performing step (b16') when a determination result of the current step is positive and step (b14') when the determination result of the current step is negative;
(b14') determining if the at least one operation in the at least one path branching from the current trunk operation are not completely selected and performing the step (b6') when a determination result of the current step is positive and step (b15') when the determination result of the current step is negative;
(b15') setting the selected operation to the current trunk operation and the branch flag to zero and resuming the step (b7'); and
(b16') determining if the selected operation is a final trunk operation and performing the step (b3') when a determination result of the current step is positive and exiting when the determination result of the current step is negative.

11. The method as claimed in claim 9, wherein in the step (e) the operations in each group are executed in parallel.

12. The method as claimed in claim 10, wherein in the step (e) the operations in each group are executed in parallel, in series or both.

13. The method as claimed in claim 10, wherein in the step (b12') any two consecutive operations in one of the groups ever created with the barrier therebetween are executed in series and the barrier is implemented by a software concept.

14. The method as claimed in claim 10, wherein in the step (b12') any two consecutive operations in one of the groups ever created with no barrier therebetween are executed in parallel.

15. The method as claimed in claim 1, wherein the examples in the dataset are multiple whole slide images (WSIs) for digital pathology, and each WSI has a slide-level diagnosis.

16. The method as claimed in claim 1, wherein in step (e) a mixed approach adopting a half-precision floating-point format and a full-precision floating point format is employed to store prefetched data and execute the multiple groups in the corresponding computational device.

17. The method as claimed in claim 1, wherein the computational graph is generated by one of a deep neural network and an image processing application.

18. A computer storage medium having computer-executable instructions thereupon that, when executed by a computing platform including a central processing unit (CPU) and at least one computational device connected to and coordinated by the CPU, cause the computing platform to:
(a) calculate a working set size of every operation in a computational graph;
(b) categorize the operations of the computational graph into multiple groups with at least one operation contained in each group and a total of the working set sizes of the at least one operation in the group less than a memory threshold of the at least one computational device;
(c) prefetch data associated with one selected from multiple examples of a dataset for executing a prefetch number of the groups N ahead of all others in the multiple groups to a corresponding computational device, wherein N is an integer greater than zero;
(d) sequentially select one of the multiple groups as a current group;
(e) simultaneously execute the at least one operation in the current group in the corresponding computational device and prefetching data associated with the example for executing a next group not yet prefetched to the corresponding computational device until both group execution and data prefetch are completed for the current group; and (f) iterate the foregoing step (d) until the multiple groups are executed.

19. The computer storage medium as claimed in claim 18, wherein the working set size of each operation is a total memory size of input data, intermediate data and output data required for execution of the operation.

20. The computer storage medium as claimed in claim 18, wherein in the steps (c) and (e) the prefetched data are input data for executing the prefetch number of the groups and the next group not prefetched yet.

21. The computer storage medium as claimed in claim 18, wherein in the step (e), when the at least one computational device includes one computational device, the multiple groups for each example associated with the dataset are executed in series in the computational device.

22. The computer storage medium as claimed in claim 18, wherein in the step (e), when the at least one computational device includes multiple computational devices, the multiple groups associated with each example of the dataset are executed in series in a corresponding computational device and all the groups associated with the multiple examples of the dataset are executed in parallel in the respective computational devices.

23. The computer storage medium as claimed in claim 18, wherein a topological order is a longest path generated by a topological sort algorithm and extending from a starting operation to an ending operation in the computational graph; and the operations of the computational graph are categorized into the multiple groups according to a sequence of (1) the operations in the topological order having no dependency, (2) the operations which have no dependency and are aligned in multiple branch paths branching from the operations not selected in the topological order, (3) the operations having dependency with other selected operations in the branch paths branching from the operations not selected in the topological order, and (4) the operations not selected in the topological order.

24. The computer storage medium as claimed in claim 18, wherein a topological order is a longest path generated by a topological sort algorithm and extending from a starting operation to an ending operation in the computational graph and a trunk operation is defined as one operation on the topological order and a branch operation is defined as one operation not on the topological order; and the operations of the computational graph are categorized into the multiple groups according to a sequence of (1) one trunk operation sequentially selected at a time along the topological order and having no dependency or having dependency with a previously selected trunk operation until the trunk operation has dependency with at least one branch operation in at least one branch path branching from the trunk operation, (2) one branch operation selected at a time in each of the at least one branch path toward a most recently-selected trunk operation and having no dependency or having dependency with at least one other previously-selected branch operation, (3) the most recently-selected trunk operation having dependency with a previously selected trunk operation and at least one previously selected branch operation in the at least one branch path branching from the most recently-selected trunk operation, (4) the operations selected by iterating the (1) to (3) of the sequence till an ending trunk operation in the topological order is selected.

25. A computing platform comprising:
a central processing unit (CPU);
at least one computational device connected to and coordinated by the CPU; and
computer-readable medium storing instructions that, when executed by the CPU, cause the CPU and the at least one computational device to perform acts comprising:
(a) calculating a working set size of every operation in a computational graph;
(b) categorizing the operations of the computational graph into multiple groups with at least one operation contained in each group and a total of the working set sizes of the at least one operation in the group less than a memory threshold of the at least one computational device;
(c) prefetching data associated with one selected from multiple examples of a dataset for executing a prefetch number of the groups N ahead of all others in the multiple groups to a corresponding computational device, wherein N is an integer greater than zero;
(d) sequentially selecting one of the multiple groups as a current group;
(e) simultaneously executing the at least one operation in the current group in the corresponding computational device and prefetching data associated with the example for executing a next group not yet prefetched to the corresponding computational device until both group execution and data prefetch are completed for the current group; and
(f) iterating the foregoing step (d) until the multiple groups are executed.

26. The computing platform as claimed in claim 25, wherein the computational device is one of graphics processing unit (GPU), tensor processing unit (TPU), dataflow processing unit (DPU) and intelligent processing unit (IPU).

27. The computing platform as claimed in claim 25, wherein the working set size of each operation is a total memory size of input data, intermediate data and output data required for execution of the operation.

28. The computing platform as claimed in claim 25, wherein in the steps (c) and (e) the prefetched data are input data for executing the prefetch number of the groups and the next group not prefetched yet.

29. The computing platform as claimed in claim 25, wherein in the step (e), when the at least one computational device includes one computational device, the multiple groups associated with each example of the dataset are executed in series in the computational device.

30. The computing platform as claimed in claim 25, wherein in the step (e), when the at least one computational device includes multiple computational devices, the multiple groups associated with each example of the dataset are executed in series in a corresponding computational device and all the groups associated with the multiple examples of the dataset are executed in parallel in the respective computational devices.

* * * * *